(12) United States Patent
Sugiura et al.

(10) Patent No.: US 7,929,725 B2
(45) Date of Patent: Apr. 19, 2011

(54) ACOUSTIC APPARATUS AND TELEPHONE CONVERSATION APPARATUS

(75) Inventors: Tomohiro Sugiura, Tokyo (JP); Shunji Yoshida, Tokyo (JP)

(73) Assignee: Mitsubishi Denki Engineering Kabushiki Kaisha, Tokyo (JP)

( * ) Notice: Subject to any disclaimer, the term of this patent is extended or adjusted under 35 U.S.C. 154(b) by 1034 days.

(21) Appl. No.: 11/665,751

(22) PCT Filed: Jan. 31, 2006

(86) PCT No.: PCT/JP2006/301562
§ 371 (c)(1),
(2), (4) Date: Apr. 19, 2007

(87) PCT Pub. No.: WO2007/032100
PCT Pub. Date: Mar. 22, 2007

(65) Prior Publication Data
US 2009/0067639 A1      Mar. 12, 2009

(30) Foreign Application Priority Data

Sep. 14, 2005 (JP) ................................. 2005-267371

(51) Int. Cl.
*H04R 25/00* (2006.01)
(52) U.S. Cl. .......................... 381/399; 381/421; 381/431
(58) Field of Classification Search .................. 381/176, 381/396, 399, 412, 421, 431
See application file for complete search history.

(56) References Cited

U.S. PATENT DOCUMENTS

| 3,164,686 | A | * | 1/1965 | Tibbetts | 381/399 |
| 4,653,103 | A | | 3/1987 | Mori et al. | |
| 4,803,733 | A | * | 2/1989 | Carver et al. | 381/399 |
| 5,003,610 | A | | 3/1991 | Adachi et al. | |
| 5,021,613 | A | * | 6/1991 | Garcia | 381/399 |
| 5,901,235 | A | * | 5/1999 | Thigpen et al. | 381/431 |
| 6,275,580 | B1 | | 8/2001 | Faraci et al. | |
| 6,810,126 | B2 | * | 10/2004 | Levitsky | 381/399 |
| 7,136,501 | B2 | * | 11/2006 | Steere et al. | 381/399 |

FOREIGN PATENT DOCUMENTS

| JP | 01-153796 U | 10/1989 |
| JP | 2-224498 A | 9/1990 |
| JP | 3-64300 A | 3/1991 |
| JP | 3-195294 A | 8/1991 |
| JP | 9-331596 A | 12/1997 |
| JP | 3159714 B2 | 2/2001 |
| JP | 2003-102088 A | 4/2003 |
| JP | 2003-179994 A | 6/2003 |
| JP | 2003-324785 A | 11/2003 |
| JP | 2004-32028 A | 1/2004 |
| JP | 2005-27020 A | 1/2005 |
| JP | 2005-303532 A | 10/2005 |
| JP | 2005-333608 A | 12/2005 |
| JP | 2006-5747 A | 1/2006 |
| WO | WO 99/03304 A1 | 1/1999 |
| WO | WO 00/78095 A1 | 12/2000 |

* cited by examiner

*Primary Examiner* — Suhan Ni
(74) *Attorney, Agent, or Firm* — Sughrue Mion, PLLC

(57) ABSTRACT

An acoustic apparatus has permanent magnets 2 and 3, which have north poles and south poles magnetized alternately in a stripe-like fashion, at the front and back of a diaphragm 1, respectively; and has a conductor circuit 4 wired on the diaphragm 1 along the stripe-like poles of the permanent magnets 2 and 3. This offers an advantage of being able to prevent an echo. The diaphragm 1, permanent magnets 2 and 3, conductor circuit 4, spacer 5, and iron plates 6 and 7 are installed in a baffle 8.

8 Claims, 6 Drawing Sheets

(a)  Front Side (b)  Back Side

FIG.2
(a)
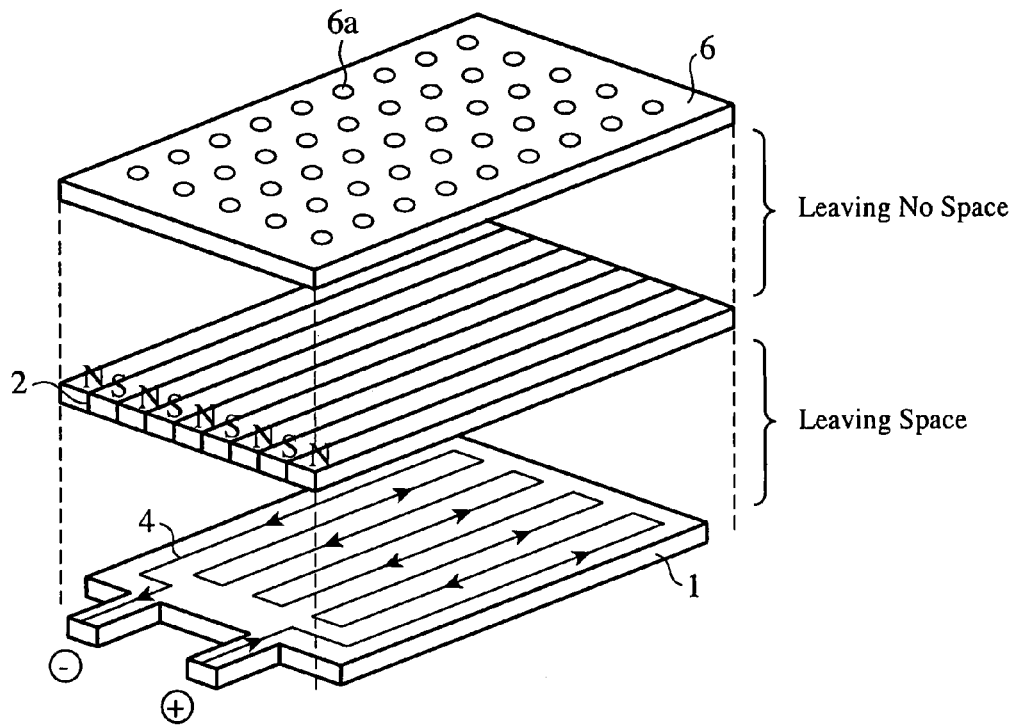
(b)
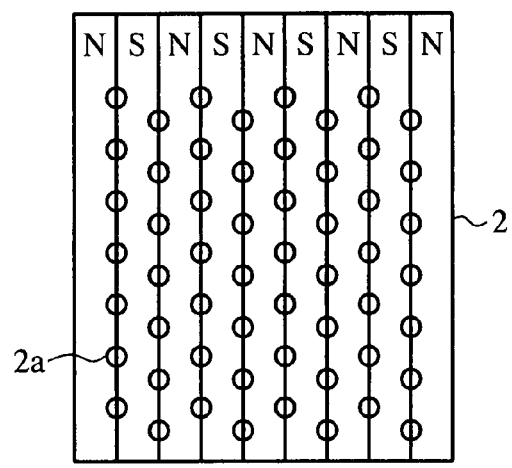

FIG.4
(a) Front Side
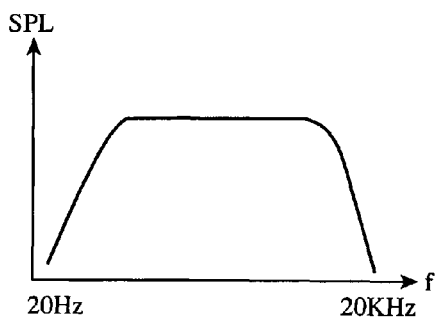
(b) Back Side
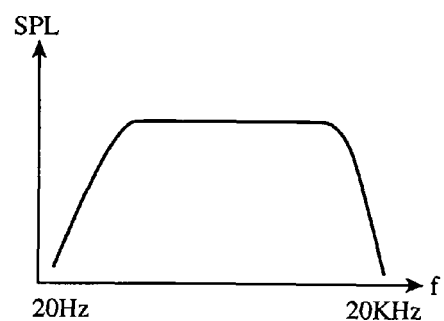
FIG.5
(a) Front Side
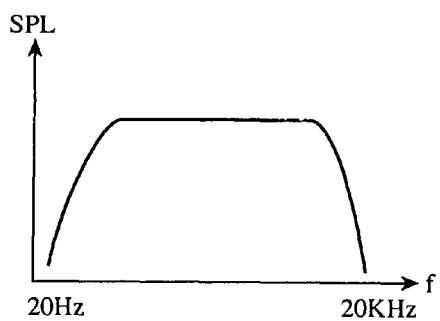
(b) Back Side
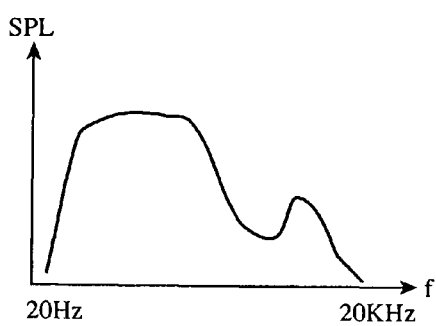

FIG.6
(a)
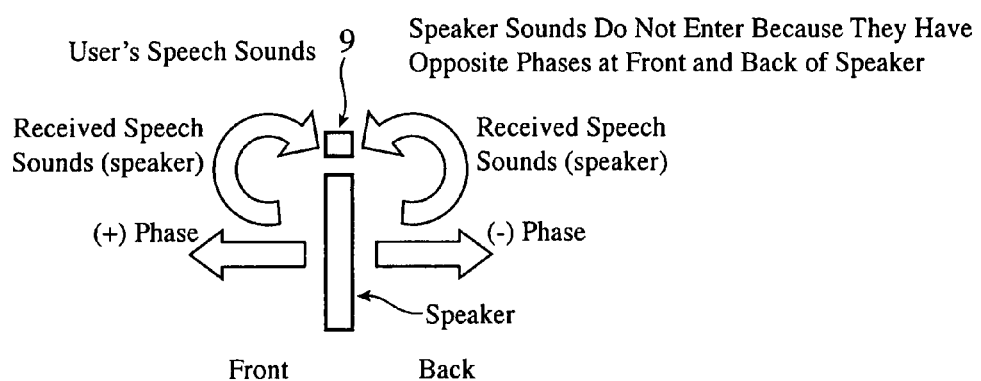
(b)
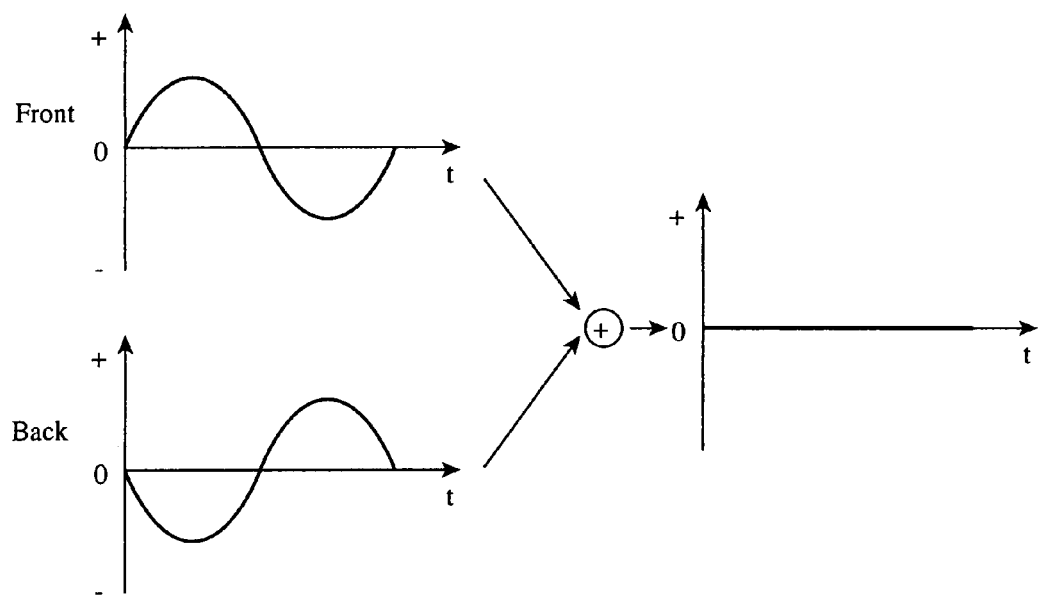

ACOUSTIC APPARATUS AND TELEPHONE CONVERSATION APPARATUS

TECHNICAL FIELD

The present invention relates to a telephone conversation apparatus with a hands-free function that reproduces speech sounds in accordance with an audio signal received by an information communication terminal such as a mobile phone, and that acquires speech sounds of a talker and supplies the audio signal to the information communication terminal, and to an acoustic apparatus applied to the telephone conversation apparatus.

BACKGROUND ART

A conventional telephone conversation apparatus with a hands-free function has a construction having a microphone mounted above a cone speaker, which outputs speech sounds of a telephone conversation party received by a mobile phone.

On the other hand, speech sounds of a user acquired by the microphone are transmitted via the mobile phone to a mobile phone of the telephone conversation party.

However, since the diaphragm of the cone speaker has a cone-like shape rather than a flat shape, frequency characteristics of the speech sounds output from the front of the speaker differ from frequency characteristics of the speech sounds output from the rear of the speaker.

In addition, the distance from the front of the speaker to the microphone differs from the distance from the rear of the speaker to the microphone.

Accordingly, even in the condition where the microphone is mounted above the cone speaker, the speech sounds output from the front of the speaker are not canceled by the speech sounds output from the rear of the speaker at the input to the microphone.

Thus, the speech sounds of the telephone conversation party received by the mobile phone are sent back to the mobile phone of the telephone conversation party, thereby arousing an echo.

To prevent the echo from being produced, the conventional telephone conversation apparatus includes an inverting circuit (echo canceling circuit) for inverting the audio signal captured by the microphone, and combines the audio signal inverted by the inverting circuit with the audio signal output from the speaker (see Patent Document 1, for example).

Patent Document 1: Japanese patent application laid-open No. 2-224498/1990 (from page 9 to page 10, and FIG. 1).

With the foregoing configuration, the conventional telephone conversation apparatus can cancel out the audio signal output from the speaker by the audio signal inverted by the inverting circuit, thereby being able to prevent the echo from being produced. However, the audio signal output from the inverting circuit has a phase delay corresponding to the inverting processing duration by the inverting circuit from the phase of the audio signal output from the speaker. Thus, the phase characteristics or frequency characteristics of the two audio signals cannot be matched completely, which offers a problem of making it difficult to completely suppress the echo.

The present invention is implemented to solve the foregoing problem. Therefore it is an object of the present invention to provide an acoustic apparatus and telephone conversation apparatus capable of preventing the production of the echo.

DISCLOSURE OF THE INVENTION

The acoustic apparatus in accordance with the present invention has magnet plates, which have north poles and south poles magnetized alternately in a stripe-like fashion, at the front and back of a diaphragm; and has a conductor circuit wired on the diaphragm along the stripe-like poles of the magnet plates.

According to the present invention, the acoustic apparatus is configured in such a manner that it has magnet plates, which have north poles and south poles magnetized alternately in a stripe-like fashion, at the front and back of a diaphragm; and has a conductor circuit wired on the diaphragm along the stripe-like poles of the magnet plates. This offers an advantage of being able to prevent an echo.

BRIEF DESCRIPTION OF THE DRAWINGS

FIG. 2 is a perspective view showing a major portion of the acoustic apparatus of the embodiment 1 in accordance with the present invention;

FIG. 4 is a diagram illustrating sound pressure frequency characteristics of the speech sounds output from a diaphragm 1 and input to a microphone;

FIG. 5 is a diagram illustrating sound pressure frequency characteristics of the speech sounds output from a cone speaker and input to the microphone;

FIG. 6 is a diagram illustrating echo cancellation;

BEST MODE FOR CARRYING OUT THE INVENTION

The best mode for carrying out the invention will now be described with reference to the accompanying drawings to explain the present invention in more detail.

EMBODIMENT 1

Figure 1:
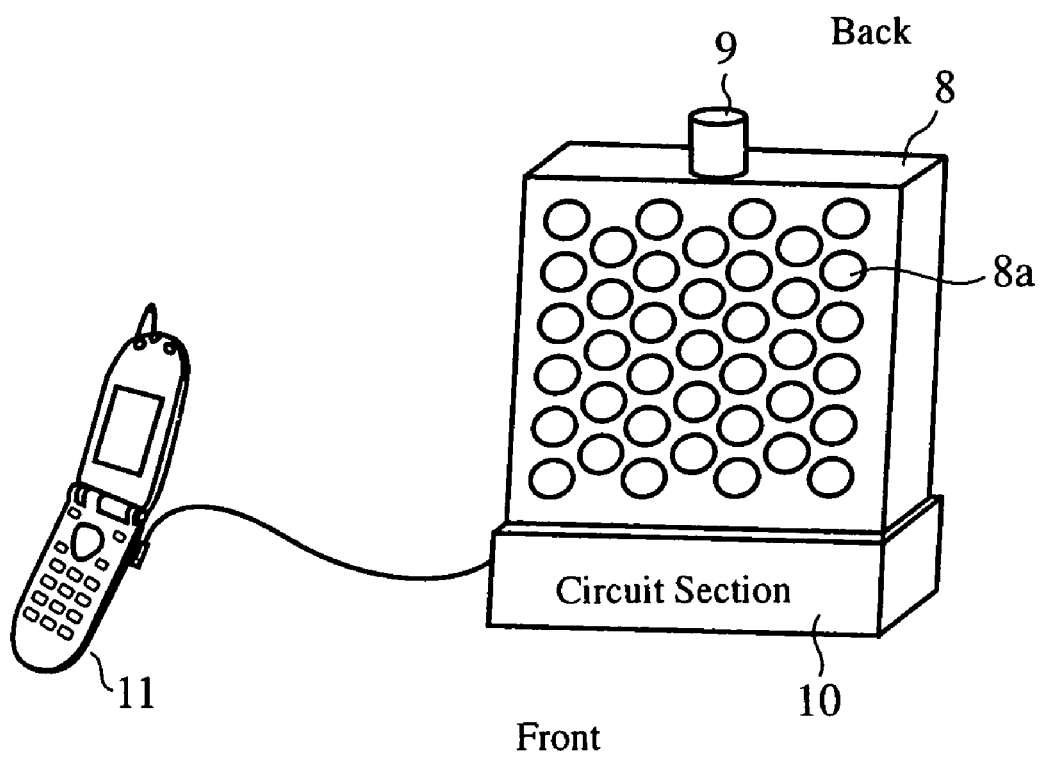
FIG. 1 is a perspective view showing a telephone conversation apparatus of an embodiment 1 in accordance with the present invention.

FIG. 1 is a perspective view showing a telephone conversation apparatus of an embodiment 1 in accordance with the present invention.

Figure 3:
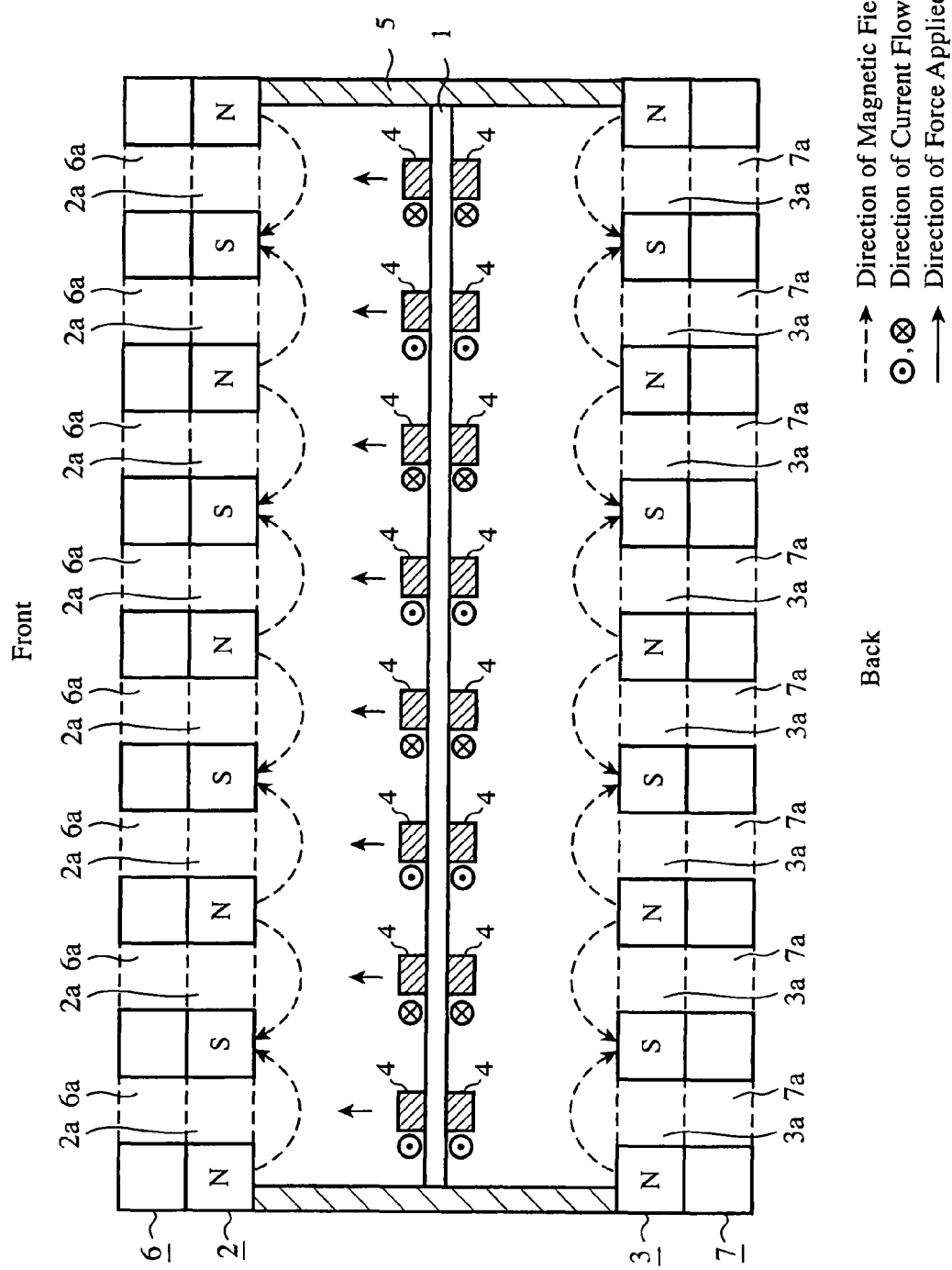
FIG. 3 is a cross-sectional view showing the major portion of the acoustic apparatus of the embodiment 1 in accordance with the present invention.

FIG. 2 is a perspective view showing a major portion of the acoustic apparatus of the embodiment 1 in accordance with the present invention; and FIG. 3 is a cross-sectional view showing the major portion of the acoustic apparatus of the embodiment 1 in accordance with the present invention.

In these figures, a diaphragm 1 is a flat board having a conductor circuit 4 (printed wiring, for example) formed on at least one of the topside and underside.

A permanent magnet 2, a first magnet plate, is placed at the front of the diaphragm 1 (at the upper side in the example of FIG. 2 and FIG. 3). The permanent magnet 2 has north poles and south poles magnetized alternately in a stripe-like fashion, and has a plurality of holes 2a formed therein.

A permanent magnet 3, a second magnet plate, is placed at the back of the diaphragm 1 (at the lower side in the example of FIG. 3). The permanent magnet 3 has north poles and south poles magnetized alternately in a stripe-like fashion in such a manner as to be aligned with those of the permanent magnet 2, and has a plurality of holes 3a formed therein.

The conductor circuit 4, a printed circuit board formed on the diaphragm 1, is wired on the diaphragm 1 along the stripe-like poles of the permanent magnets 2 and 3.

More specifically, the conductor circuit 4 is wired at the locations corresponding to the borders between the north poles and the south poles of the permanent magnets 2 and 3 (locations corresponding to the holes 2a and 3a of the permanent magnets 2 and 3). The wiring direction at the locations in which the north poles are at the left and the south poles are at the right is opposite to the wiring direction at the locations in which the south poles are at the left and the north poles are at the right.

A spacer 5 supports the permanent magnet 2 and permanent magnet 3 to prevent them from making contact with the diaphragm 1.

A first iron plate 6 is placed at the front of the permanent magnet 2 (at the upper side in the example of FIG. 2 and FIG. 3), and has a plurality of holes 6a formed therein.

A second iron plate 7 is placed at the back of the permanent magnet 3 (at the lower side in the example of FIG. 3), and has a plurality of holes 7a formed therein.

The iron plates 6 and 7 are placed in close contact with the permanent magnets 2 and 3.

A baffle 8 is a casing including the diaphragm 1, permanent magnets 2 and 3, conductor circuit 4, spacer 5, and iron plates 6 and 7. The baffle 8 has a plurality of holes 8a formed therein.

A microphone 9 is located equidistant from the front surface of the baffle 8 and the back surface of the baffle 8. In the example of FIG. 1, since the microphone 9 has upward directivity, it is mounted on top of the baffle 8. If the microphone 9 has right directivity, it is mounted on the right side of the baffle 8, and if the microphone 9 has left directivity, it is mounted on the left side of the baffle 8.

If the diaphragm 1 and permanent magnets 2 and 3 are not stored in the baffle 8, however, the microphone 9 is located equidistant from the surface of the iron plate 6 and the surface of the iron plate 7.

A circuit section 10 includes an amplifier. The amplifier amplifies the audio signal acquired by the microphone 9, and supplies the audio signal to a mobile phone 11. On the other hand, the amplifier amplifies the audio signal received by the mobile phone 11, and supplies the audio signal to the conductor circuit 4.

The mobile phone 11, an information communication terminal, receives the audio signal of the telephone conversation party, and supplies the audio signal to the amplifier of the circuit section 10. On the other hand, the mobile phone 11 transmits the audio signal amplified by the amplifier of the circuit section 10 to the mobile phone or the like of the telephone conversation party.

Next, the operation will be described.

Receiving the audio signal transmitted from the mobile phone or the like of the telephone conversation party, the mobile phone 11 supplies the audio signal to the amplifier of the circuit section 10.

Receiving the audio signal of the telephone conversation party from the mobile phone 11, the amplifier of the circuit section 10 amplifies the audio signal, and supplies the amplified audio signal to the conductor circuit 4.

This causes the current to flow through the conductor circuit 4 in the directions as shown in FIG. 2 and FIG. 3, for example.

Consider the case where the current flows in the directions as shown in FIG. 2 and FIG. 3. In this case, since the permanent magnets 2 and 3 and iron plates 6 and 7 form a magnetic field, and the diaphragm 1 receives the upward force because of Fleming's left-hand rule, the diaphragm 1 vibrates upward.

In contrast, when the current flows in the directions opposite to those shown in FIG. 2 and FIG. 3, the diaphragm 1 receives downward force, and vibrates downward because of the Fleming's left-hand rule.

The vibration of the diaphragm 1 reproduces the audio signal of the telephone conversation party. Thus, the speech sounds of the telephone conversation party are output through the holes 2a, 6a and 8a of the permanent magnet 2, iron plate 6 and baffle 8, and at the same time through the holes 3a, 7a and 8a of the permanent magnet 3, iron plate 7 and baffle 8.

In this case, the microphone 9 is located equidistant from the front surface of the baffle 8 and the back surface of the baffle 8 as shown in FIG. 1, and the diaphragm 1 has a flat shape. Accordingly, as illustrated in FIG. 4, the sound pressure frequency characteristics of the speech sounds which are output from the holes 2a, 6a and 8a of the permanent magnet 2, iron plate 6 and baffle 8 and are input to the microphone 9 agree with the sound pressure frequency characteristics of the speech sounds which are output from the holes 3a, 7a and 8a of the permanent magnet 3, iron plate 7 and baffle 8 and are input to the microphone 9.

In contrast, when the speaker is a cone type, the sound pressure frequency characteristics of the speech sounds which are output from the front surface of the speaker and are input to the microphone do not agree with the sound pressure frequency characteristics of the speech sounds which are output from the back surface of the speaker and are input to the microphone as illustrated in FIG. 5.

According to the embodiment 1, the sound pressure frequency characteristics of the speech sounds which are output from the holes 2a, 6a and 8a of the permanent magnet 2, iron plate 6 and baffle 8 and are input to the microphone 9 agree with the sound pressure frequency characteristics of the speech sounds which are output from the holes 3a, 7a and 8a of the permanent magnet 3, iron plate 7 and baffle 8 and are input to the microphone 9. Thus, as illustrated in FIG. 6, the audio signals from both sides cancel out each other when input to the microphone 9.

As a result, even if the speech sounds of the telephone conversation party are output from the speaker, they are not input to the microphone 9, thereby producing no echo.

On the other hand, speech sounds of the user are captured by the microphone 9. The amplifier of the circuit section 10 amplifies the audio signal captured by the microphone 9, and supplies the audio signal to the mobile phone 11.

Thus, the mobile phone 11 transmits the audio signal amplified by the amplifier to the mobile phone or the like of the telephone conversation party, thereby delivering the speech sounds of the user to the telephone conversation party.

As is clear from the above, the present embodiment 1 is configured in such a manner that the permanent magnets 2 and 3, which have the north poles and the south poles magnetized alternately in a stripe-like fashion, are placed at the front and back of the diaphragm 1, and that the wiring is formed on the diaphragm 1 along the stripe-like poles in the permanent magnets 2 and 3. Accordingly, the present embodiment 1 offers an advantage of being able to prevent the echo generation.

In addition, the present embodiment 1 has the diaphragm 1, permanent magnets 2 and 3, conductor circuit 4, spacer 5, and iron plates 6 and 7 built in the baffle 8. Thus, the present embodiment 1 offers an advantage of being able to widen the sound pressure frequency characteristics of the speech sounds output from the holes 6a and 7a of the iron plates 6 and 7.

Figure 7:
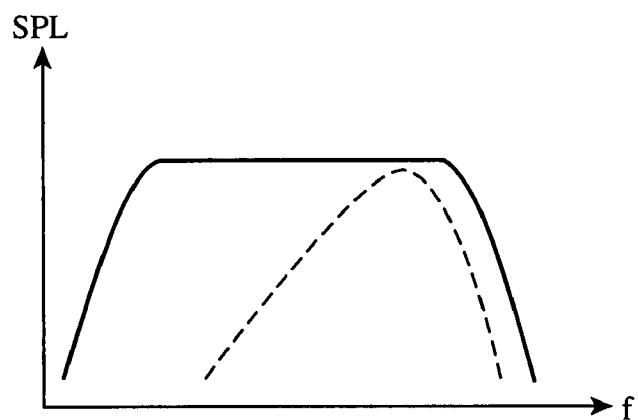
FIG. 7 is a diagram illustrating the frequency characteristics of the sound pressure of the speech sounds when the speaker is placed in a baffle and when it is not placed in the baffle.

More specifically, as indicated by the dotted-curve of FIG. 7, unless the diaphragm 1, permanent magnets 2 and 3, conductor circuit 4, spacer 5, and iron plates 6 and 7 are built in the baffle 8, the sound pressure frequency characteristics of the speech sounds deteriorate in a low frequency range so that the speech sounds sound like a metallic sound for the user.

In contrast, as indicated by solid curve of FIG. 7, when the diaphragm 1, permanent magnets 2 and 3, conductor circuit 4, spacer 5, and iron plates 6 and 7 are built in the baffle 8, the sound pressure frequency characteristics of the speech sounds do not deteriorate even in the low frequency range, so that the speech sounds of the telephone conversation party are faithfully reproduced and perceived by the user.

EMBODIMENT 2

Figure 8:
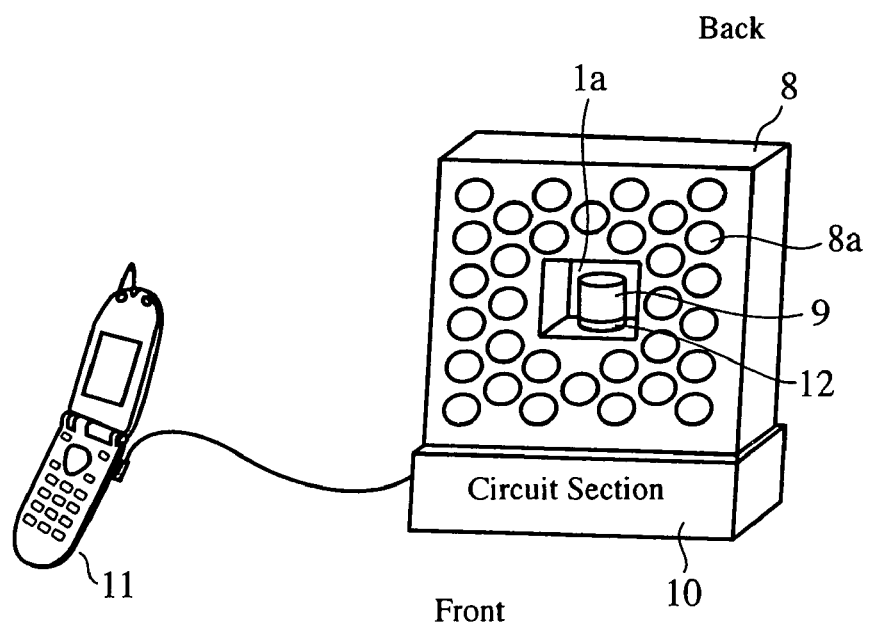
FIG. 8 is a perspective view showing a telephone conversation apparatus of an embodiment 2 in accordance with the present invention.

Although the foregoing embodiment 1 is described by way of example having the microphone 9 with the upward directivity mounted on the baffle 8, this is not essential. For example, as shown in FIG. 8, such a configuration is also possible which has the microphone 9 with the directivity in the plane direction of the diaphragm 1 mounted in a hole 1*a* formed at the center of the diaphragm 1.

When the microphone 9 with the upward directivity is mounted on the top of the baffle 8, the cancellation accuracy of the audio signal at the microphone 9 can be deteriorated because of the effect of the echo from the ceiling depending on the material or shape of the ceiling or on the distance to the ceiling.

In contrast, when the microphone 9 is mounted in the hole 1a formed at the center of the diaphragm 1 (in the example of FIG. 8, the microphone 9 is mounted on a cushioning material 12 to reduce the effect of the vibration of the baffle 8), the intensity of speech sounds output from the diaphragm 1 and directly input to the microphone 9 becomes much greater than that of the echo from the ceiling. Thus, the present embodiment 2 can prevent the deterioration in the cancellation accuracy of the audio signal at the microphone 9.

Thus, the present embodiment 2 offers an advantage of being able to improve the suppression accuracy of the echo as compared with the foregoing embodiment 1.

Although FIG. 8 shows an example employing the microphone 9 with the upward directivity, it is enough for the microphone to have the directivity in the plane direction of the diaphragm 1. For example, the directivity of the microphone 9 can be right direction, left direction or downward direction.

Although FIG. 8 shows an example in which the baffle 8 has a square shape when seen from the front, this is not essential. For example, it may have a round shape.

Although FIG. 8 shows an example having the single baffle 8, such a configuration is also possible that assembles a plurality of baffles 8 and places the microphone 9 at the center of them.

EMBODIMENT 3

Although the foregoing embodiments 1 and 2 are described by way of example in which the amplifier of the circuit section 10 is connected to the mobile phone 11, this is not essential. For example, the amplifier of the circuit section 10 can be connected to an interphone.

In this case, the amplifier of the circuit section 10 amplifies the audio signal of the user acquired by the microphone 9, and supplies the audio signal to the interphone.

Thus, the speech sounds of the user can be delivered to a visitor via an interphone installed at the gate of a house.

On the other hand, the amplifier amplifies the audio signal of the visitor captured by the interphone, and supplies the audio signal to the conductor circuit 4.

Thus, the present embodiment 3 can prevent the echo in the same manner as the foregoing embodiment 1.

INDUSTRIAL APPLICABILITY

As described above, the acoustic apparatus and telephone conversation apparatus in accordance with the present invention can prevent the echo, and is suitable for a use for the telephone conversation apparatus with the hands-free function and for the acoustic apparatus to be applied to the telephone conversation apparatus.

What is claimed is:

1. An acoustic apparatus comprising:
    a first magnet plate which is placed at the front of a diaphragm, has north poles and south poles magnetized alternately in a stripe-like fashion, and has a plurality of holes formed;
    a second magnet plate which is placed at the back of the diaphragm, has north poles and south poles magnetized alternately in a stripe-like fashion in a manner as to align with the poles of said first magnet plate, and has a plurality of holes formed;
    a conductor circuit which is wired on said diaphragm and along the stripe-like poles on said first and second magnet plates;
    a first iron plate which is placed at the front of said first magnet plate, and has a plurality of holes formed;
    a second iron plate which is placed at the back of said second magnet plate, and has a plurality of holes formed; and
    a microphone which is located equidistant from a surface of said first iron plate and a surface of said second iron plate.

2. The acoustic apparatus according to claim 1, wherein said conductor circuit is wired at locations corresponding to borders between the north poles and the south poles of said first and second magnet plates, and wherein a direction of the wiring at locations seeing the north poles at left-hand sides and the south poles at right-hand sides is opposite to a direction of the wiring at locations seeing the south poles at left-hand sides and the north poles at the right-hand sides.

3. The acoustic apparatus according to claim 1, wherein said diaphragm, said conductor circuit, said first and second magnet plates, and said first and second iron plates are stored in a casing.

4. The acoustic apparatus according to claim 3, wherein said microphone has upward directivity and is mounted on top of the casing.

5. The acoustic apparatus according to claim 1, wherein said microphone has directivity in a plane direction of the diaphragm and is mounted in a hole formed at a center of the diaphragm.

6. The acoustic apparatus according to claim 1, further comprising a plate-like baffle about a direction of a plane of the diaphragm.

7. A telephone conversation apparatus comprising:
    an acoustic apparatus including:
        a first magnet plate which is placed at the front of a diaphragm, has north poles and south poles magnetized alternately in a stripe-like fashion, and has a plurality of holes formed;
        a second magnet plate which is placed at the back of the diaphragm, has north poles and south poles magnetized alternately in a stripe-like fashion in a manner as to align with the poles of said first magnet plate, and has a plurality of holes formed;
a conductor circuit which is wired on said diaphragm and along the stripe-like poles on said first and second magnet plates;
a first iron plate which is placed at the front of said first magnet plate, and has a plurality of holes formed;
a second iron plate which is placed at the back of said second magnet plate, and has a plurality of holes formed; and
a microphone which is located equidistant from a surface of said first iron plate and a surface of said second iron plate, and an amplifier which amplifies the audio signal captured by said microphone, and supplies the audio signal to an information communication terminal, and which amplifies an audio signal received by the information communication terminal, and supplies the audio signal to said conductor circuit.

8. A telephone conversation apparatus comprising:
an acoustic apparatus including:
- a first magnet plate which is placed at the front of a diaphragm, has north poles and south poles magnetized alternately in a stripe-like fashion, and has a plurality of holes formed;
- a second magnet plate which is placed at the back of the diaphragm, has north poles and south poles magnetized alternately in a stripe-like fashion in a manner as to align with the poles of said first magnet plate, and has a plurality of holes formed;
- a conductor circuit which is wired on said diaphragm and along the stripe-like poles on said first and second magnet plates;
- a first iron plate which is placed at the front of said first magnet plate, and has a plurality of holes formed;
- a second iron plate which is placed at the back of said second magnet plate, and has a plurality of holes formed; and
- a microphone which is located equidistant from a surface of said first iron plate and a surface of said second iron plate, and an amplifier which amplifies the audio signal captured by said microphone, and supplies the audio signal to an interphone, and which amplifies an audio signal captured by the interphone, and supplies the audio signal to said conductor circuit.

\* \* \* \* \*